US009294825B2

(12) United States Patent
Bharat et al.

(10) Patent No.: US 9,294,825 B2
(45) Date of Patent: Mar. 22, 2016

(54) SYSTEM AND METHOD FOR UTILITY METER ACTIVATION

(71) Applicant: General Electric Company, Schenectady, NY (US)

(72) Inventors: Bruce Bharat, Smyrna, GA (US); Christopher Charles Yasko, Milton, GA (US)

(73) Assignee: General Electric Company, Schenectady, NY (US)

( * ) Notice: Subject to any disclaimer, the term of this patent is extended or adjusted under 35 U.S.C. 154(b) by 531 days.

(21) Appl. No.: 13/647,364

(22) Filed: Oct. 8, 2012

(65) Prior Publication Data

US 2014/0097965 A1    Apr. 10, 2014

(51) Int. Cl.
  *H04Q 9/00* (2006.01)
  *G01D 4/00* (2006.01)

(52) U.S. Cl.
  CPC ............. *H04Q 9/00* (2013.01); *G01D 4/002* (2013.01); *G01D 4/008* (2013.01); *H04Q 2209/00* (2013.01); *H04Q 2209/50* (2013.01); *H04Q 2209/60* (2013.01)

(58) Field of Classification Search
  CPC ..... G01D 4/002; G01D 4/008; Y02B 90/241; Y02B 90/246; Y02B 90/247; Y04S 20/32; Y04S 20/42; Y04S 20/50; H04Q 2209/00; H04Q 2209/50; H04Q 2209/60
  See application file for complete search history.

(56) References Cited

U.S. PATENT DOCUMENTS

| | | | |
|---|---|---|---|
| 5,805,442 A | 9/1998 | Crater et al. | |
| 6,088,659 A * | 7/2000 | Kelley et al. | 702/62 |
| 6,373,399 B1 | 4/2002 | Johnson et al. | |
| 6,867,707 B1 * | 3/2005 | Kelley et al. | 340/870.02 |
| 2005/0065742 A1 | 3/2005 | Rodgers | |
| 2008/0109537 A1 | 5/2008 | Aune et al. | |
| 2009/0310764 A1 * | 12/2009 | Gerhart | 379/142.04 |
| 2011/0271110 A1 * | 11/2011 | Ohba et al. | 713/168 |

FOREIGN PATENT DOCUMENTS

EP    2863182 A1    4/2015

OTHER PUBLICATIONS

Sierra Wireless, "CDPD Primer", Apr. 2001, <http://www.angelfire.com/linux/cdpd/Proyecto/PDF/CDPD/2130006.pdf>, accessed Jul. 8, 2015, all pages pertinent.*

(Continued)

*Primary Examiner* — Andrew Bee
(74) *Attorney, Agent, or Firm* — Sutherland Asbill & Brennan LLP

(57) ABSTRACT

A utility network includes a utility meter capable of measuring a property of the network once installed and capable of communicating the measurement to a server once activated. The network also includes an access point configured to communicatively couple to the utility meter and to the server and configured to notify the server when the utility meter has been bound to the access point. The network further includes a mobile device configured to notify the server when the utility meter has been installed, configured to request the server to add the utility meter to a queue of utility meters to be activated by the server, and configured to receive a response from the server when the utility meter is activated.

18 Claims, 5 Drawing Sheets

(56) References Cited

OTHER PUBLICATIONS

Google, "cdpd channel scanning", <https://www.google.com/search?q=cdpd+channel+scanning&oq=cdpd+channel+scanning&aqs=chrome..69i57.759j0j9&sourceid=chrome&es_sm=122&ie=UTF-8>, performed Jul. 8, 2015, all pages pertinent.*

Extended European search report dated Feb. 28, 2014 for Application No. EP 13189050, European Patent Office, Munich, Germany. (See pp. 16 and 17 of the EP 2863182A1 reference dated Apr. 22, 2015).

* cited by examiner

SYSTEM AND METHOD FOR UTILITY METER ACTIVATION

BACKGROUND

The subject matter disclosed herein relates to activating sensors, such as utility meters for a power, water, gas, or other utility distribution network.

Certain utility networks, such as power, water, and gas distribution networks, may include a number of sensors distributed throughout the network in communication with a centralized control system. For example, a power distribution network may include a number of meters (e.g., "smart" meters) disposed at customer locations throughout the network to monitor the consumption of power. Furthermore, these meters may communicate with a centralized control system, which may use the monitoring data collected by the meter to, for example, determine each customer's monthly utility bill. Accordingly, it may be desirable for the meters and the centralized control system to be communicatively coupled to exchange information.

BRIEF DESCRIPTION

In an embodiment, a utility network includes a utility meter capable of measuring a property of the network once installed and capable of communicating the measurement to a server once activated. The network also includes an access point configured to communicatively couple to the utility meter and to the server and configured to notify the server when the utility meter has been bound to the access point. The network further includes a mobile device configured to notify the server when the utility meter has been installed, configured to request the server to add the utility meter to a queue of utility meters to be activated by the server, and configured to receive a response from the server when the utility meter is activated.

In another embodiment, a method includes receiving instructions to activate a utility meter that has been installed in a network and adding the utility meter to a queue of utility meters to be activated. The method also includes receiving notification from an access point that the utility meter has been bound by the access point. The method also includes activating the utility meter, wherein activating the utility meter includes establishing communication with the utility meter via the access point. The method further includes updating the queue of utility meters to be activated to indicate an activation status of the utility meter.

In another embodiment, a tangible, non-transitory, computer-readable medium stores instructions executable by a processor of an electronic device. The instructions include instructions to receive user input when a utility meter has been installed in a utility network. The instructions also include instructions to notify a server that the utility meter has been installed. The instructions also include instructions to receive notification from the server that the utility meter has been added to a list of utility meters to be activated by the server and to provide user notification that the utility meter has been added to the list. The instructions also include instructions to receive notification from the server that the utility meter has been activated by the server to provide user notification that the utility meter has been activated.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
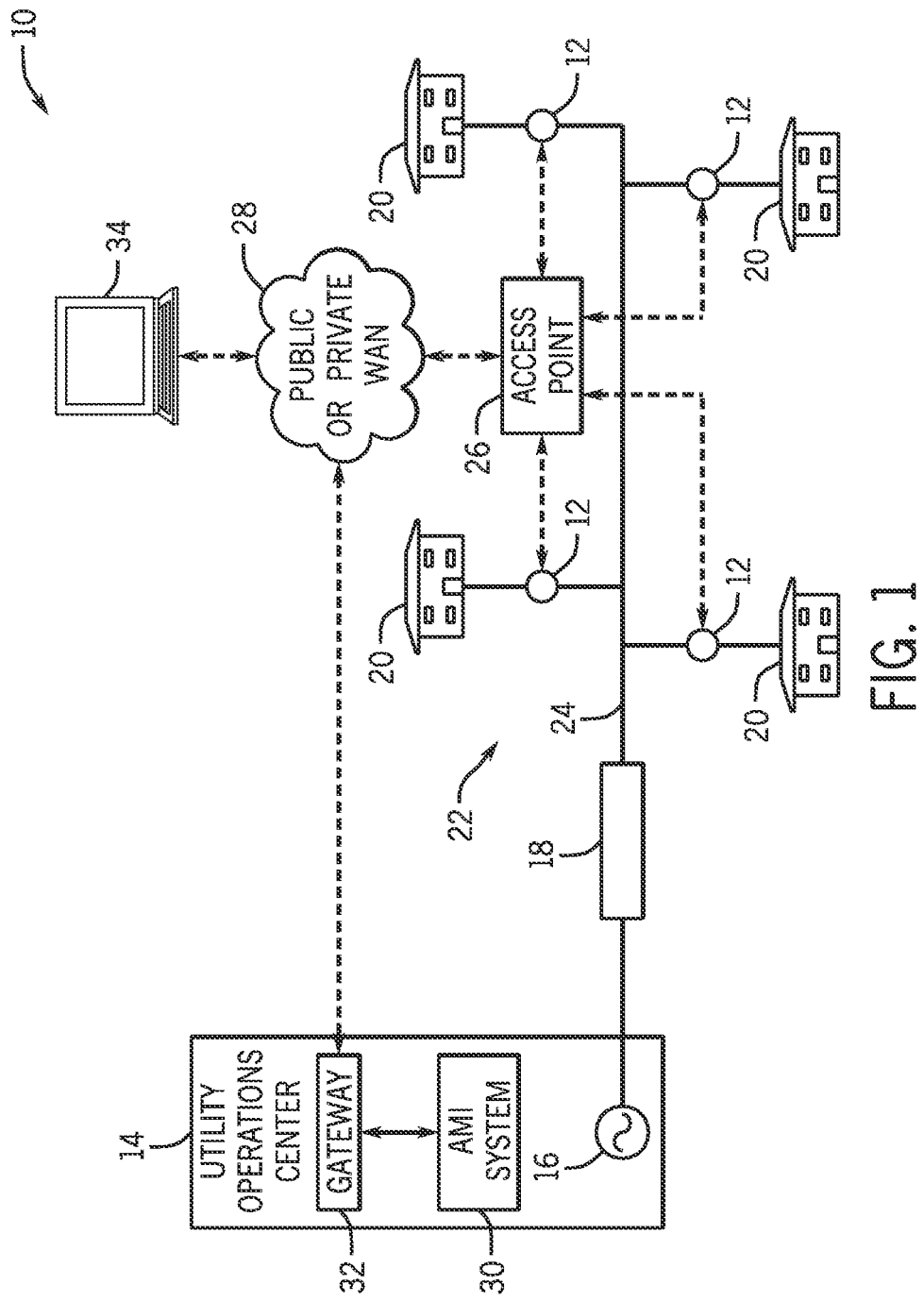
FIG. 1 is a block diagram of a power distribution network, in accordance with an embodiment of the present approach.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As set forth above, it may be desirable for the sensors and the centralized control system of a network (e.g., a power, water, or gas distribution network, or other suitable utility network) to be communicatively coupled to one another to exchange information. For example, it may be desirable to communicatively couple a sensor (e.g., a "smart" meter) and a centralized controller (e.g., an Advanced Metering Infrastructure (AMI) system) of a power distribution network. Accordingly, during installation of the meter, it may be desirable for an installer to ensure that the meter is in communication with the AMI system. However, since it may take minutes to hours to establish communication, it may not be efficient for an installer to wait for communication to be established after installing a meter. Furthermore, as discussed below, allowing the installer to directly communicate with the meter (e.g., via an electrical device) may also introduce an opportunity for unauthorized access to the meter.

Accordingly, present embodiments are directed toward systems and methods for establishing communication between a sensor (e.g., a "smart" utility meter) and a centralized system (e.g., an AMI system) of a utility network (e.g., a power distribution network). For example, present embodiments enable an installer to utilize a mobile device (e.g., a laptop or cell phone) to notify an AMI system of a meter's physical installation as well as to receive updates from the AMI system regarding the meter's activation status. Additionally, present embodiments include an access point that communicatively couples the meters to the centralized system (e.g., the AMI system) of the utility network. As set forth below, the meter, access point, and centralized system may cooperate to activate the meter (e.g., establish communication between the meters and the centralized systems via the access points). As set forth below, present embodiments enable the activation of meters without an installer having to directly communicate with the sensor, which may help to limit unauthorized access to the meter. Furthermore, present embodiments improve the efficiency of meter installation by enabling an installer to notify the centralized system of the physical installation of a new meter from a mobile device and allowing the installer to proceed to the next physical installation without waiting for communication to be established.

With the foregoing in mind, FIG. 1 illustrates an embodiment of a network, power distribution network 10, which enables an installer to efficiently and securely activate sensors (e.g., "smart" utility meters 12) within the power distribution network 10. Accordingly, the power distribution network 10 may include a utility operations center 14, which may operate a power source 16 (e.g., a coal, gas, or nuclear power plant, a main transmission line from a power plant, or other suitable power source). Further, the power distribution network 10 may include a number of other electrical components 18 (e.g., transformers, capacitors, converters, switches, transmission lines, and so forth) suitable for the transmission and/or conversion of power being supplied by the power source 16 to render the power suitable for use at a number of customer locations 20 (e.g., residential or commercial locations).

In particular, the power distribution network 10 illustrated in FIG. 1 includes a segment 22 of a larger power distribution network 10. The illustrated segment 22 includes a transmission line 24 that couples each of the customer locations 20 to the power distribution network 10. More specifically, each customer location 20 includes a sensor (e.g., a "smart" utility meter 12) disposed between the customer location 20 and the transmission line 24. As set forth in detail below, "smart" utility meters 12 may include a memory and a processor capable of performing a number of functions by executing one or more instructions. For example, the illustrated meters 12 include sensors to determine power consumption at each of the customer locations 20. Further, the meters 12 include one or more network interface devices to enable the meter to communicate with other devices. For example, in certain embodiments, the meters 12 may also be capable of communicating with a remote system to determine a current price for power, an average price for power over a period of time, a total amount of power consumed at a customer location 20 over a period of time, and so forth.

Specifically, the meters 12 illustrated in FIG. 1 are communicatively coupled to an access point 26. In certain embodiments, the access point 26 may be a dedicated utility access point 26 (e.g., dedicated to providing a communication bridge for the meters 12). In other embodiments, the access point 26 may be a general purpose wireless access point. As illustrated in FIG. 1, the meters 12 may be equipped with one or more wireless network interface devices and may be wirelessly coupled to the access point 26. In certain embodiments, the meters 12 and the access point 26 may wirelessly communicate using a standard wireless protocol (e.g., 802.x, Bluetooth™, Zigbee, code division multiple access (CDMA), or other suitable wireless protocol). In other embodiments, the access point 26 may be coupled to the transmission line 24 and may communicate with the meters 12 using the transmission line 24 via a power line communication technique (e.g., broadband over powerline (BPL), or other suitable power line communication technique). Furthermore, as discussed below, communication between the access point 26 and the meters 12 may, in certain embodiments, be based on a proprietary communication technique for which hardware may not be widely available. Additionally, in certain embodiments, communication between the access point 26 and the meters 12 may be encrypted or otherwise secured to prevent unauthorized access.

Furthermore, the illustrated access point 26 is capable of communicating over a public or private wide area network (WAN) 28. For example, the illustrated access point 26 may include one or more wireless network interface devices to enable the access point 26 to couple to and communicate over the WAN 28. In certain embodiments, the WAN 28 may be a public WAN 28, such as a WAN 28 of cellular data towers in a cellular data network. As such, in certain embodiments, the access point 26 may connect to the WAN 28 of the cellular data network in order to exchange data with other systems across the WAN 28. It should be appreciated that the WAN 28 may also represent a connection to any number of networks (e.g., the Internet) to facilitate communication between the access point 26 and other systems. In other embodiments, the WAN 28 may be a private WAN, such as a WAN that is operated and controlled by the utility operation center 14 (e.g., specifically for the exchange of utility data).

The access point 26 illustrated in FIG. 1 is communicatively coupled to an AMI system 30 disposed at the utility operations center 14 via the WAN 28. More specifically, the access point 26 and the AMI system 30 may exchange information (e.g., packets of data) with one another via the gateway 32 and the WAN 28. Accordingly, in certain embodiments, the access point 26 may have Internet access via a connection to the WAN 28 (e.g., a cellular data WAN 28) and the gateway 32 may also have a wired or wireless Internet connection. Accordingly, the access point 26 may route information over the Internet (or over a private network) to the gateway 32, such that the information may be received by the AMI system 30. It should be appreciated that, in certain embodiments, the access point 26 and the gateway 32 or the AMI system 30 may exchange suitable security credentials (e.g., security certificates or keys) to verify their respective identities and, in some embodiments, to establish an encrypted communication channel between the devices for enhanced security.

For example, one function of the power distribution network 10 illustrated in FIG. 1 is remote meter reading. That is, the "smart" utility meters 12 of the power distribution network 10 are capable of determining, storing, and communicating an amount of power consumed at each customer location 20 in the power distribution network 10. To provide this information to the AMI system 30, the illustrated meters 12 may first relay information (e.g., one or more data packets) to the access point 26, which may, in turn, route the information through the WAN 28 (e.g., the Internet) and the gateway 32 to reach the AMI system 30. In certain embodiments, the meters 12 may relay monitoring information to the AMI system 30 periodically or based on a request received from the AMI system 30 (e.g., via the gateway 32, WAN 28, and access point 26, respectively). It should be appreciated that, in certain embodiments, the meters 12 and the gateway 32 or the AMI system 30 may exchange suitable security credentials (e.g., security certificates or keys) to ensure their respective identities and, in some embodiments, to establish an encrypted communication channel between the devices for enhanced security.

As such, when a new meter 12 is added to the power distribution network 10, the new meter 12 is first physically installed (e.g., physically disposed between the transmission line 24 and the customer location 20 by an installer) and subsequently activated. "Activation" of a meter 12, as used herein, may generally refer to establishing a communication link (e.g., channel or route) between the meter 12 and the AMI system 30. As such, after physically installing a new meter 12, an installer may begin an activation process to communicatively couple the meter 12 and the AMI system 30.

However, it may be desirable to prevent (e.g., deter, mitigate, or otherwise lessen) unauthorized access to the meters 12. That is, since there may be financial motivation to alter the behavior and/or contents of the meter 12 (e.g., to alter an amount of power consumed at a particular customer location 20), it may be desirable to have the meters 12 communicate with the access point 26 using an uncommon or proprietary protocol and/or hardware. Accordingly, in order to communicate with the meters 12, in certain embodiments, the access point 26 may be equipped with a complementary network interface device to communicate using the uncommon or proprietary protocol and/or hardware. Furthermore, in certain embodiments, the access point 26 and the meters 12 may communicate using an encrypted communication channel, and may further utilize an exchange of security credentials (e.g., security certificates or keys installed on the access point 26 and the meters 12 upon manufacturing or installation) to verify the identities of both the access point 26 and the meters 12.

Furthermore, in order to further enhance security, in certain embodiments, the power distribution network 10 illustrated in FIG. 1 may enforce a policy to not allow any device to communicate directly with the meter 12 except for the access point 26. As such, in certain embodiments, an installer installing a new meter 12 in the power distribution network 10 may not carry or use a device that directly communicates with the new meter 12. Instead, as set forth in detail below, present embodiments enable an installer to use a mobile device 34 (e.g., communicatively coupled to the AMI system 30 via the WAN 28) to activate a new meter 12 without directly communicating with the new meter 12. By avoiding the use of a device configured to directly interface with the meters 12 in the field, present embodiments reduce the possibility for unauthorized meter access in the power distribution network 10. Furthermore, in certain embodiments, the meters 12, the access point 26, or both, may be configured to detect unauthorized access (e.g., an attempt to modify the contents of the memory of the meter 12) or unauthorized communication, and may notify the AMI System 30 of the unauthorized access or unauthorized communication.

Figure 2:
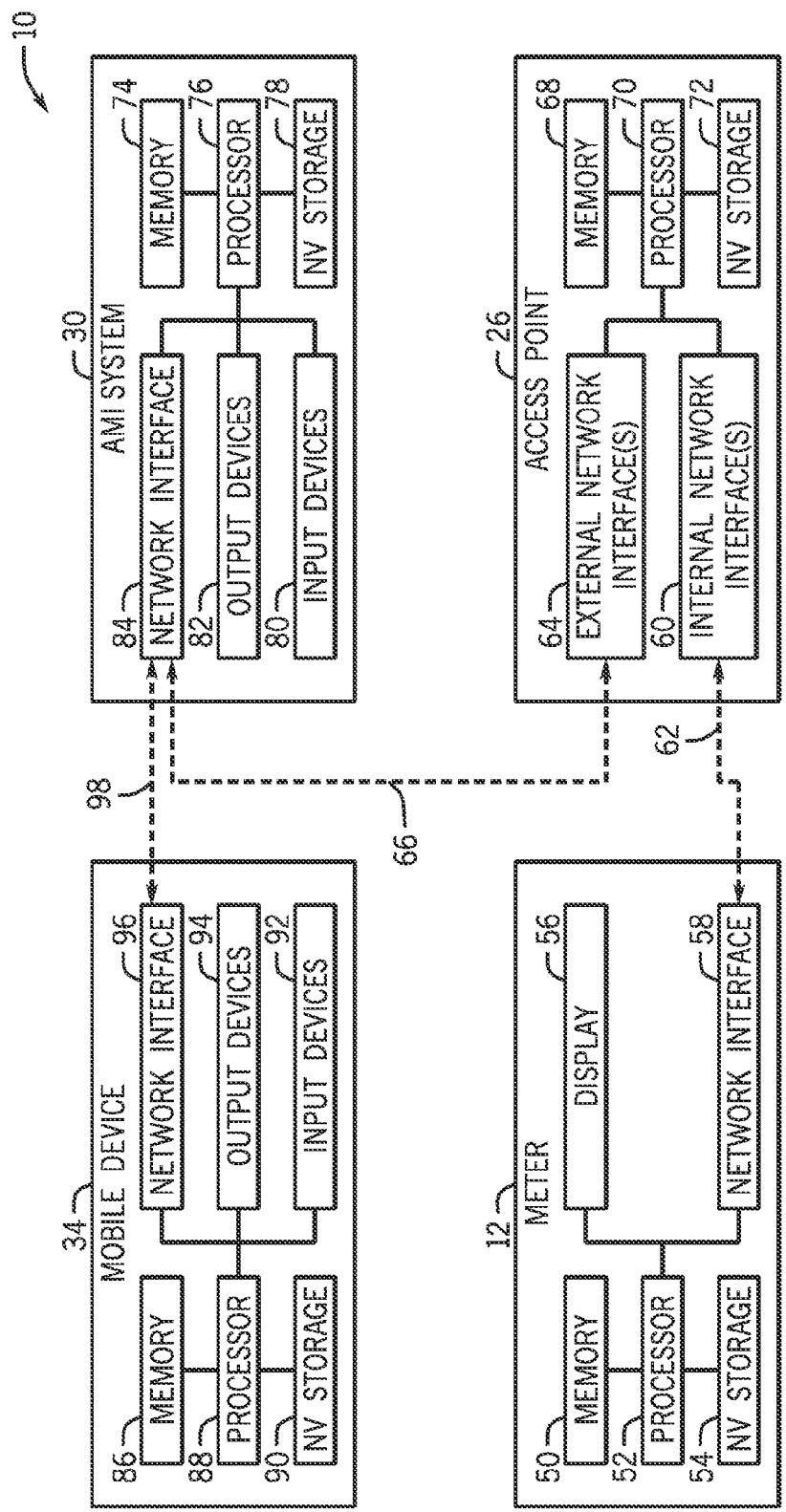
FIG. 2 is a block diagram illustrating certain internal components of a meter, access point, AMI system, and mobile device of the power distribution network illustrated in FIG. 1, in accordance with an embodiment of the present approach.

FIG. 2 illustrates certain internal components of an embodiment of the power distribution network 10 illustrated in FIG. 1. In particular, FIG. 2 illustrates certain internal components of the meter 12, the access point 26, the AMI system 30, and the mobile device 34 for an embodiment of the power distribution network 10. These illustrated components enable an installer to activate sensors (e.g., "smart" utility meters 12) within the power distribution network 10 in an efficient and secure manner. As set forth above, the meter 12, the access point 26, the AMI system 30, and the mobile device 34 may cooperate with one another in order to activate a new meter 12 in the power distribution network 10.

The new meter 12 illustrated in FIG. 2 is a "smart" meter, which includes a memory 50 (e.g., random access memory (RAM), read-only memory (ROM), or other suitable memory) and a processor 52 (e.g., any suitable microprocessor) capable of respectively storing and executing instructions. The meter 12 may also include nonvolatile (NV) storage 54 (e.g., a hard drive, solid-state disk (SSD), flash drive, or other suitable nonvolatile storage) that may, for example, store values measured and/or determined by the meter 12. For example, the meter 12 may execute instructions using the processor 52 to determine an amount of power consumed at a particular customer location 20, and may store this value in the NV storage 54 for later use. Additionally, in certain embodiments, the meter 12 may include a display 56 that may be used (e.g., by the processor 52) to display information to the installer and/or customer. Furthermore, the illustrated meter 12 includes a network interface 58 that enables communication with at least one access point 26. As set forth above, in certain embodiments, the network interface 58 may be an uncommon or proprietary network interface device, in addition, or in the alternative to various encryption and identity verification techniques (e.g., certificate exchanges), to make unauthorized network access to the meter 12 more difficult.

The access point 26 illustrated in FIG. 2 also includes a memory 68 (e.g., random access memory (RAM), read-only memory (ROM), or other suitable memory), a processor 70 (e.g., any suitable microprocessor), and nonvolatile (NV) storage 72 (e.g., a hard drive, solid-state disk (SSD), flash drive, or other suitable nonvolatile storage). As such, the access point 26 is generally capable of storing and executing instructions. Additionally, the access point 26 includes one or more internal network interfaces 60 for interfacing with one or more meters 12. In certain embodiments, each internal network interface 60 may communicatively couple to a single meter 12, while, in other embodiments, each internal network interface 60 may communicatively couple with multiple meters 12. As mentioned above, in certain embodiments, communication 62 between the meter 12 and the access point 26 may occur wirelessly or via a wired connection (e.g., using a power line communication technique). Furthermore, the access point 26 includes one or more external network interfaces 64 that are capable of coupling the access point 26 to the AMI system 30. As set forth above, communication 66 between the access point 26 and the AMI system 30 may occur wirelessly and/or via a wired connection in the WAN 28. In certain embodiments, the access point 26 may be equipped with multiple or redundant external network interfaces 64 (e.g., a primary wireless network interface to a cellular data WAN 28 and a secondary wired Internet connection) for use in load balancing and/or failover situations.

The AMI system 30 illustrated in FIG. 2 also includes a memory 74 (e.g., random access memory (RAM), read-only memory (ROM), or other suitable memory), a processor 76 (e.g., any suitable microprocessor), and nonvolatile (NV) storage 78 (e.g., a hard drive, solid-state disk (SSD), flash drive, or other suitable nonvolatile storage) for use in storing and executing instructions to control the power distribution network 10. The illustrated AMI system 30 also includes input devices 80 (e.g., mice, keyboards, touchpads, touchscreens, microphones, and/or other suitable input devices) and output devices 82 (e.g., monitors, liquid crystal displays (LCDs), touchscreens, speakers, printers, and/or other suitable output devices) to facilitate user interaction with the AMI system 30. Furthermore, the illustrated AMI system 30 includes at least one network interface 84 capable of facilitating communication between the AMI system 30 and the access point 26, as well as between the AMI system 30 and the mobile device 34. Accordingly, in certain embodiments, the network interface 84 of the AMI system 30 may be coupled to a gateway (e.g., gateway 32 illustrated in FIG. 1), which, in turn, is coupled to a WAN (e.g., the Internet).

The mobile device 34 illustrated in FIG. 2 may be a laptop, tablet, handheld electronic device, cell phone, or other suitable electronic mobile device 34 capable of communicating with the AMI system 30. The illustrated mobile device 34 includes a memory 86 (e.g., random access memory (RAM), read-only memory (ROM), or other suitable memory), processor 88 (e.g., any suitable microprocessor), and nonvolatile (NV) storage 90 (e.g., a hard drive, solid-state disk (SSD), flash drive, or other suitable nonvolatile storage) for use in storing and executing instructions. Additionally, the illustrated mobile device 34 includes input devices 92 (e.g., mice, keyboards, touchpads, touchscreens, microphones, and/or other suitable input devices) and output devices 94 (e.g., monitors, liquid crystal displays (LCDs), touchscreens, speakers, printers, and/or other suitable output devices) to facilitate installer interaction with the mobile device 34. Furthermore, the illustrated mobile device 34 includes at least one network interface 96 capable of communication 98 with the AMI system 30. For example, in certain embodiments, the network interface 96 of the mobile device 34 may be a wireless network interface (e.g., 802.x, CDMA, or other suitable wireless network interface) or a wired network interface (e.g., Ethernet or other suitable wired network interface) that provides the mobile device 34 with a network connection (e.g., an Internet connection) for communication 98 to the AMI system 30.

Figure 3:
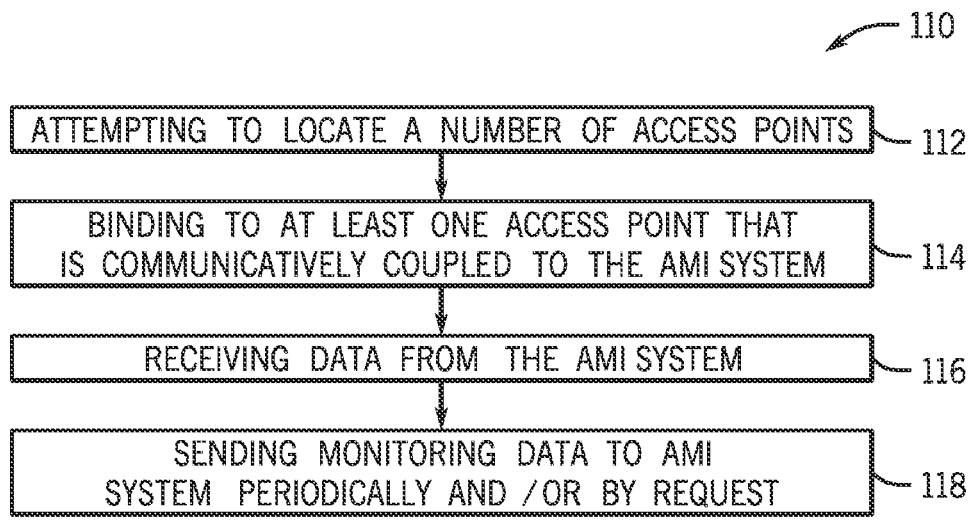
FIG. 3 is a flow diagram illustrating a process by which a meter is activated, from the perspective of the meter, in accordance with an embodiment of the present approach.
Figure 4:
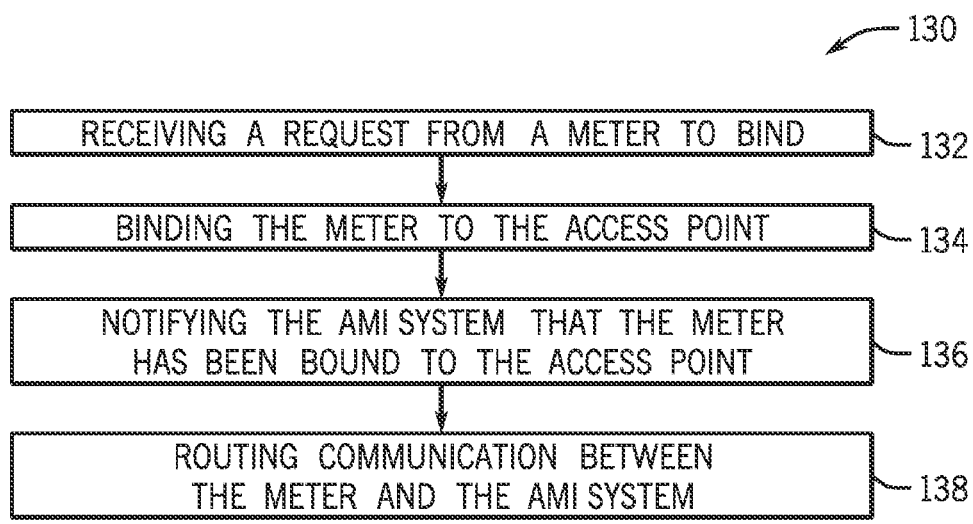
FIG. 4 is a flow diagram illustrating a process, from the perspective of the access point of FIG. 2, by which a new meter is activated, in accordance with an embodiment of the present approach.
Figure 5:
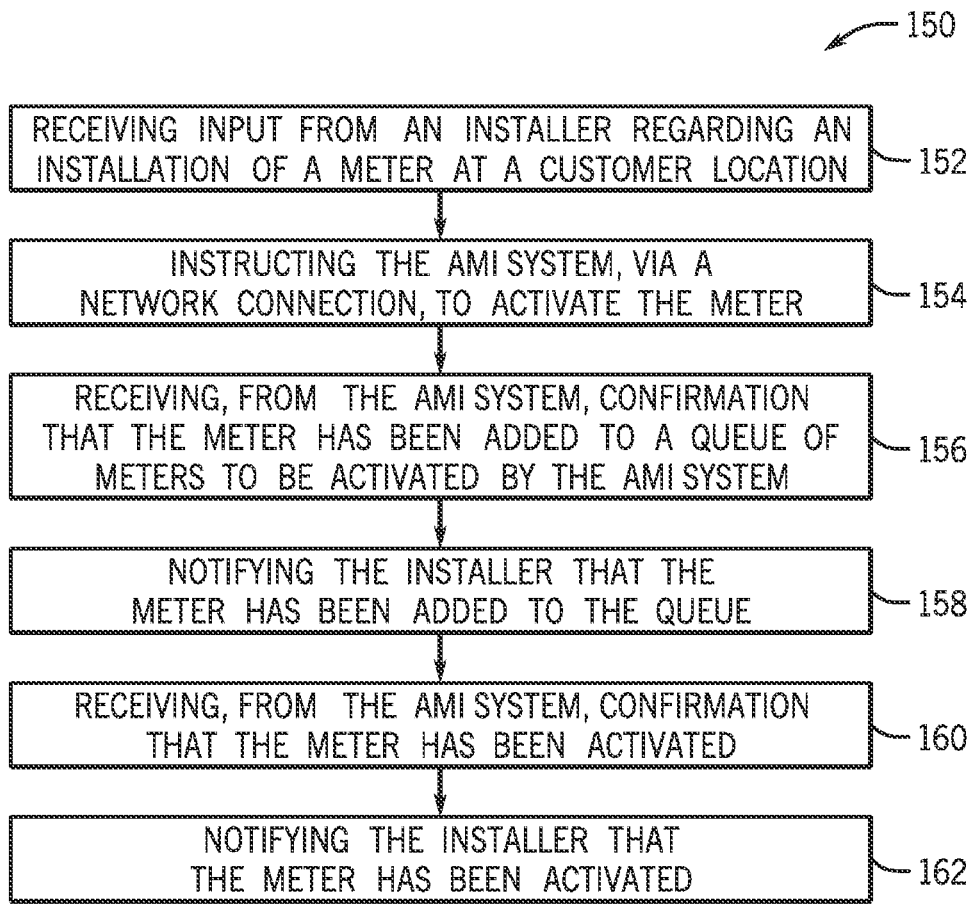
FIG. 5 is a flow diagram illustrating a process, from the perspective of the mobile device of FIG. 2, by which a new meter is activated, in accordance with an embodiment of the present approach.
Figure 6:
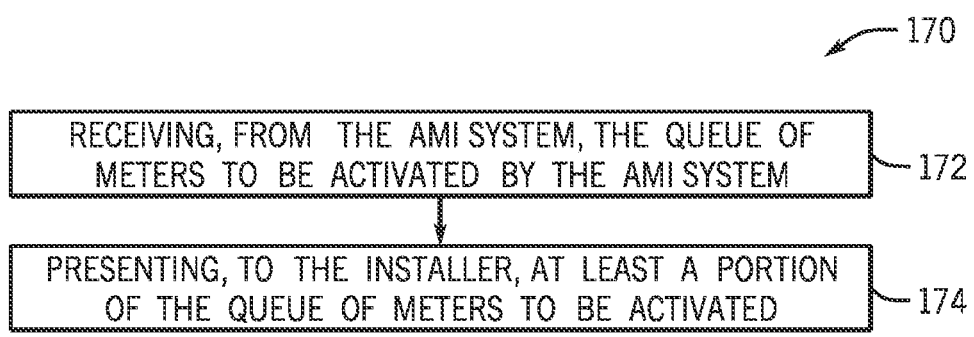
FIG. 6 is a flow diagram illustrating a process by which the mobile device of FIG. 2 may update the installer, in accordance with an embodiment of the present approach.
Figure 7:
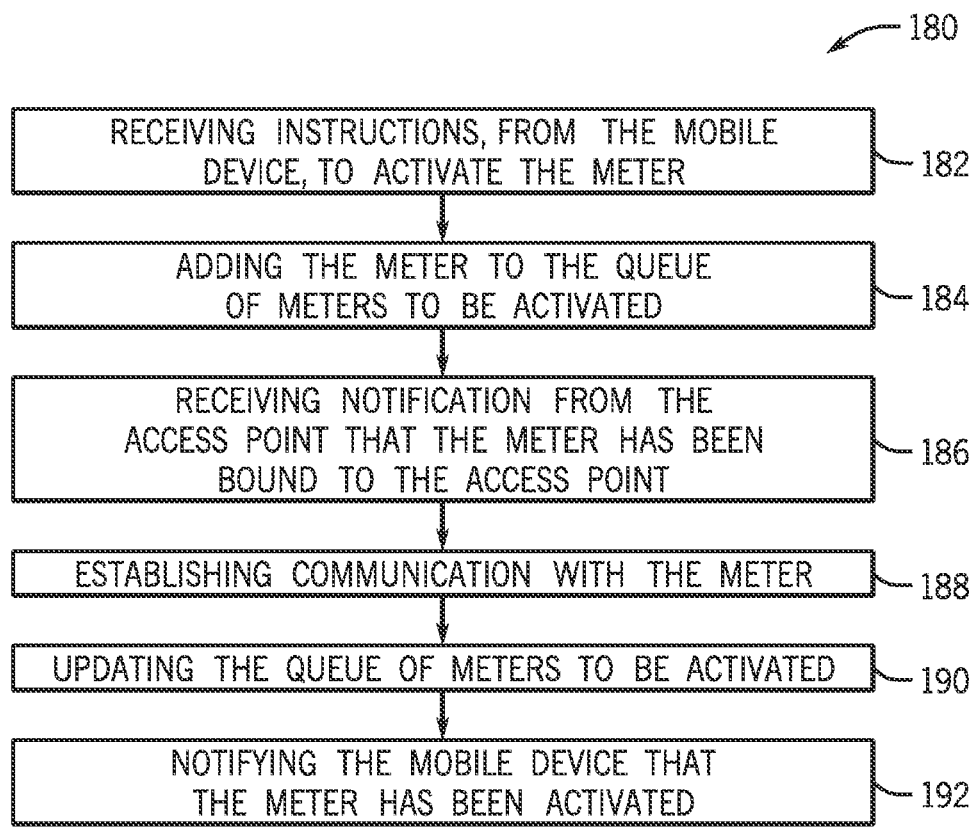
FIG. 7 is a flow diagram illustrating a process, from the perspective of the AMI system of FIG. 2, by which a new meter is activated, in accordance with an embodiment of the present approach.

With the foregoing in mind, FIGS. 3-7 illustrate embodiments of processes that may be executed by the various components of the power distribution network 10 (illustrated in FIGS. 1 and 2) when activating a new meter 12 in the power distribution network 10. In particular, FIG. 3 illustrates a process that may be executed by the meter 12 (e.g., processor 52 of the meter 12), FIG. 4 illustrates a process that may be executed by the access point 26 (e.g., processor 70 of the access point 26), FIGS. 5 and 6 illustrates processes that may be executed by the mobile device 34 (e.g., processor 88 of the mobile device 34), and FIG. 7 illustrates a process that may be executed by the AMI system 30 (e.g., processor 76 of the AMI system 30). It should be appreciated that certain steps illustrated in FIGS. 3-7 may, in certain embodiments, be executed concurrently and/or in other orders.

For example, FIG. 3 illustrates an embodiment of a process 110, from the perspective of a new meter 12, whereby the new meter 12 may be activated. That is, the process 110 may be executed by the processor 52 of the new meter 12 during activation. The illustrated process 110 begins with the new meter 12 attempting (block 112) to locate a number of access points 26. For example, the meter 12 may scan particular channels and/or broadcast on particular channels (e.g., wired or wireless) to locate one or more nearby access points 26 in the power distribution network 10. Subsequently, the meter 12 may bind (block 114) to at least one access point 26, in which the access point 26 is communicatively coupled to the AMI system 30 (e.g., via the WAN 28 and/or gateway 32 illustrated in FIG. 1). Once bound to (e.g., associated with or connected to) the access point 26, the meter 12 may be communicatively coupled to the access point 26. At some point after binding to the access point 26, the meter 12 may receive (block 116) data from the AMI system 30 to confirm activation of the meter 12. Then, having been activated, the meter 12 may send (block 118) monitoring data to the AMI system 30 periodically and/or by request of the AMI system 30.

FIG. 4 illustrates an embodiment of a process 130, from the perspective of the access point 26, whereby the new meter 12 may be activated. That is, the process 130 may be executed by the processor 70 of the access point 26 during activation of the new meter 12. The illustrated process 130 begins with the access point 26 receiving (block 132) a request from a meter to bind to (e.g., communicatively couple to and/or establish a connection with) the access point 26. For example, the access point 26 may detect the new meter 12 scanning and/or broadcasting on a particular wired or wireless channel. Subsequently, the access point 26 may bind (block 134) to the new meter 12. After binding to the new meter 12, the access point 26 may notify (block 136) the AMI system that the meter 12 has been bound to the access point 26. That is, the access point 26 may use communication 66 illustrated in FIG. 2 (e.g., including the WAN 28 and/or gateway 32 illustrated in FIG. 1) to send information (e.g., one or more data packets) to the AMI system 30, such that the AMI system 30 may record the connection between the meter 12 and the access point 26. After notifying the AMI system 30, the access point 26 may proceed to route (block 138) communication between the activated meter 12 and the AMI system 30.

FIG. 5 illustrates an embodiment of a process 150, from the perspective of the mobile device 34, whereby a new meter 12 may be activated in the power distribution network 10. That is, the process 150 may be executed by the processor 88 of the mobile device 34 during activation of the new meter 12. The illustrated process 150 begins with the mobile device 34 receiving (block 152) input from an installer regarding an installation of a new meter at a customer location 20. For example, the memory 86 and the processor 88 of the mobile device 34 may respectively store and execute a user interface that the installer may use (e.g., via input devices 92 and output devices 94) to enter information about the installation of the new meter 12. By specific example, the user interface may allow the installer to enter information such as the physical location of the new meter 12, an identification number for the new meter 12, model information for the new meter 12, rating information for the new meter 12, time and date of new meter installation, and/or other suitable information regarding the new meter 12.

Continuing through the illustrated process 150, after receiving input from the installer (e.g., via a user interface), the mobile device 34 may instruct (block 154) the AMI system 30, via network connection 98, to activate the new meter 12. As set forth above, in certain embodiments, the instructions from the mobile device 34 may traverse the public or private WAN 28 illustrated in FIG. 1 to reach the AMI system 30. At some point after instructing the AMI system 30 to activate the meter 12, the mobile device 34 may receive (block 156), from the AMI system 30, confirmation that the meter 12 has been added to a queue (e.g., a list or other suitable data structure) of meters to be activated by the AMI system. For example, the mobile device 34 may receive information (e.g., one or more data packets) from the AMI system 30 denoting a time at which the new meter 12 was added to the queue. Then, the mobile device 34 may notify (block 158) the installer that the meter 12 has been added to the queue of meters to be activated. Subsequently, the mobile device 34 may receive (block 160), from the AMI system 30, confirmation that the meter has been activated. Accordingly, the mobile device 34 may notify (block 162) the installer that the meter 12 has been activated. In other embodiments, rather than receiving confirmation of the meter's successful activation (e.g., in block 160), the mobile device 34 may instead receive a notification if the meter 12 was not successfully activated (e.g., a failure notification), and the mobile device 34 may subsequently notify the installer that the meter 12 was not successfully activated.

In certain embodiments, the mobile device 34 may receive more information from the AMI system 30 regarding the queue of the meters 12 to be activated. That is, in certain embodiments, the steps 156, 158, 160, and 162 of the process 150 illustrated in FIG. 5 may be substituted by the process 170 illustrated in FIG. 6. Accordingly, after instructing the AMI system 30 to activate the meter 12 (e.g., in block 154 of the process 150), the mobile device 34 may receive (block 172), from the AMI system 30, the queue of meters to be activated by the AMI system 30. For example, in certain embodiments, the mobile device 34 may receive a queue that includes all meters awaiting activation by the AMI system 30. Subsequently, the mobile device 34 may present (block 174), to the installer, at least a portion of the received queue of meters 12 to be activated by the AMI system 30. In certain embodiments, the mobile device 34 may present to the installer a subset of the queue of new meters 12 awaiting activation by the AMI system 30 (e.g., only meters 12 queued by the installer, only meters 12 queued within a particular time frame, only meters 12 that have been successfully activated, only meters 12 that have failed to successfully activate, and so forth). Furthermore, in certain embodiments, the steps 172 and 174 of the process 170 may periodically repeat (e.g., every few minutes, every few hours, every few days, or with other suitable frequency) such that the installer may be able to determine the activation status of the new meter 12.

FIG. 7 illustrates an embodiment of a process 180, from the perspective of the AMI system 30, whereby a new meter 12 may be activated. That is, the process 180 may be executed by the processor 76 of the AMI system 30 during activation of the new meter 12. The illustrated process 180 begins with the AMI system 30 receiving (block 182) instructions, from the mobile device 34, to activate the new meter 12 (e.g., via communication 98). In certain embodiments, the AMI system 30 may verify one or more security credentials (e.g., username/password, certificate, or other suitable credential) of the mobile device 34 and/or the installer before proceeding. Subsequently, the AMI system 30 may add (block 184) the meter 12 to the queue of meters to be activated (e.g., stored in the memory 74 and/or NV storage 78 of the AMI system 30). At some point, the AMI system 30 may receive (block 186) notification from the access point 26 that the meter 12 has been bound to the access point 26. It should be appreciated that, in certain embodiments, block 186 may occur before blocks 184 and/or 182.

Continuing through the process 180 illustrated in FIG. 7, after adding the meter 12 to the queue and receiving notification from the access point 26 that the meter 12 has been bound, the AMI system 30 may establish (block 188) communication with the meter 12 (e.g., activate the meter 12). As mentioned above, communication between the AMI system 30 and the meter 12 may traverse the public or private WAN 28 and/or gateway 32. After establishing communication with the meter 12, the AMI system 30 may update (block 190) the queue of meters to be activated. Further, in certain embodiments, the AMI system 30 may notify (block 192) the mobile device 34 that the meter 12 has been activated. In certain embodiments, the AMI system 30 may provide to the mobile device 34 information (e.g., time of activation, any errors or warnings encountered, or other suitable information) related to the activation of the meter 12. In other embodiments, rather than providing confirmation of the meter's successful activation (e.g., in block 192), the AMI system 30 may instead provide a notification if the meter 12 was not successfully activated (e.g., communication with the meter 12 was not established in block 188).

Technical effects of the present approach include enabling an installer to efficiently and securely activate sensors, such as "smart" utility meters 12, within a utility network (e.g., a power, water, gas or similar utility network). That is, present embodiments improve the efficiency of sensor installation by enabling an installer to notify the centralized system (e.g., the AMI system) of the physical installation of a new sensor (e.g., a new meter 12) from a mobile device and allowing the installer to proceed to the next physical installation without waiting for communication to be established. Furthermore, present embodiments enable the activation of sensors (e.g., meters 12) in the network (e.g., power distribution network 10) without requiring the installer to directly communicate with the sensor, reducing the potential for unauthorized access of the sensors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a utility meter capable of measuring a property of a utility network and capable of communicating a measurement of the property of the network to a server; and
a mobile device configured to notify the server when the utility meter has been installed and to request the server to add the utility meter to a queue of utility meters to be activated by the server, the mobile device comprising a display for displaying a response from the server, the response comprising a subset of the queue of utility meters, the subset identifying one or more utility meters that have failed to successfully activate.

2. The system of claim 1, wherein the server is configured to activate the queue of utility meters and to notify the mobile device when the utility meter has been activated.

3. The system of claim 1, wherein the subset of the queue only identifies the one or more utility meters that have failed to successfully activate.

4. The system of claim 1, wherein the mobile device is configured to receive periodic updates of at least a portion of the queue from the server.

5. The system of claim 1, further comprising an access point communicatively coupled to the utility meter and to the server using at least one of a wired, a wireless, or a power-line communication technique, the access point configured to notify the server when the utility meter is bound to the access point.

6. The system of claim 5, wherein the utility meter is configured to only directly bind to the access point and no other devices.

7. The system of claim 5, wherein the utility meter and the access point are configured to communicate with one another over an encrypted channel after exchanging security credentials.

8. The system of claim 5, wherein the access point and the server are configured to communicatively couple to one another via a private wide area network (WAN), a cellular data WAN, or a combination thereof.

9. The system of claim 5, wherein the utility meter, the access point, or both are configured to detect unauthorized access or unauthorized communication, and configured to notify the server of the unauthorized access or unauthorized communication.

10. The system of claim 1, wherein the server comprises an advanced metering infrastructure (AMI) server.

11. A method, comprising:
receiving instructions from a mobile device to activate a utility meter that has been installed in a network;
adding the utility meter to a queue of utility meters to be activated;
receiving notification from an access point that the utility meter has been bound by the access point in response to a coupling request;
transmitting, to the mobile device, identification of one or more utility meters that have failed to successfully activate; and
displaying on the mobile device, a subset of the queue, the subset of the queue indicating the one or more utility meters that have failed to successfully activate.

12. The method of claim 11, comprising notifying the mobile device of an activation status of the utility meter.

13. The method of claim 12, wherein notifying the mobile device comprises sending to the mobile device an updated queue, wherein the activation status of the meter comprises successfully activated, unsuccessfully activated, and pending.

14. The method of claim 11, wherein the mobile device is not configured to bind to the utility meter.

15. The method of claim 11, wherein receiving notification from the access point comprises receiving information from the access point via a public or private wide area network.

16. The method of claim 11, wherein the utility meter comprises a power meter and the network comprises a power distribution network.

17. A tangible, non-transitory, computer-readable medium storing a plurality of instructions executable by a processor of an electronic device, the instructions comprising:
instructions to receive user input when a utility meter has been installed in a utility network;
instructions to notify a server that the utility meter has been installed, wherein the utility meter is capable of measuring a property of the network and communicating a measurement of the property of the network to the server once installed;
instructions to receive notification from the server that the utility meter has been added to a queue of utility meters to be activated by the server;
instructions to provide user notification that the utility meter has been added to the queue;
instructions to receive from the server, an indication comprising one or more utility meters that have failed to successfully activate; and
instructions to display on the mobile device, a subset of the queue, the subset of the queue indicating the one or more utility meters that have failed to successfully activate.

18. The medium of claim 17, wherein the utility meter comprises a power meter, the network comprises a power distribution network, and the server comprises an advanced metering infrastructure (AMI) server.

* * * * *